(12) United States Patent
Massicotte

(10) Patent No.: US 12,234,132 B2
(45) Date of Patent: Feb. 25, 2025

(54) SELF-RETRACTABLE WINCH

(71) Applicant: Luc Massicotte, Weedon (CA)

(72) Inventor: Luc Massicotte, Weedon (CA)

( * ) Notice: Subject to any disclaimer, the term of this patent is extended or adjusted under 35 U.S.C. 154(b) by 445 days.

(21) Appl. No.: 17/564,856

(22) Filed: Dec. 29, 2021

(65) Prior Publication Data

US 2022/0212906 A1 Jul. 7, 2022

Related U.S. Application Data

(60) Provisional application No. 63/133,259, filed on Jan. 1, 2021.

(51) Int. Cl.
*B66D 1/74* (2006.01)
*B60P 7/08* (2006.01)
*B66D 1/04* (2006.01)

(52) U.S. Cl.
CPC .......... *B66D 1/7484* (2013.01); *B60P 7/0823* (2013.01); *B66D 1/04* (2013.01)

(58) Field of Classification Search
CPC ........ B66D 1/04; B66D 1/7484; B66D 3/006; B66D 5/34; B60P 7/0846; B60P 7/083; B60P 7/0823
See application file for complete search history.

(56) References Cited

U.S. PATENT DOCUMENTS

| | | | | |
|---|---|---|---|---|
| 2,946,563 A | * | 7/1960 | Eaton ....................... | B66D 1/04 410/37 |
| 2,991,975 A | * | 7/1961 | Michael ................... | B66D 1/04 410/103 |
| 4,036,476 A | | 7/1977 | Douce et al. | |
| 4,063,712 A | * | 12/1977 | Arbogast ................ | B60P 7/083 410/37 |
| 4,842,458 A | | 6/1989 | Carpenter | |
| 4,884,928 A | * | 12/1989 | Nachtigall .............. | B60P 7/083 410/103 |
| 4,900,203 A | * | 2/1990 | Pope ....................... | B60P 7/083 D34/33 |
| 5,282,706 A | | 2/1994 | Anthony | |
| 5,344,121 A | * | 9/1994 | Baziuk ..................... | B66D 5/34 254/366 |
| 5,853,164 A | | 12/1998 | Hunt | |
| 6,059,499 A | | 5/2000 | Bird | |
| 7,195,433 B2 | | 3/2007 | Cash | |

(Continued)

FOREIGN PATENT DOCUMENTS

KR 10-2193280 12/2020

*Primary Examiner* — Seahee Hong
(74) *Attorney, Agent, or Firm* — Benoit & Cote Inc.; Mathieu Audet

(57) ABSTRACT

A self-retracting tie down winch for tying cargo on a vehicle is provided. The self-retracting tie down winch comprise a frame that can be attached temporarily or permanently to the transport vehicle, a binding system to secure the cargo, the binding system comprising a gear and a unidirectional pawl and driver to insert a binding media. The self-retracting tie down winch further comprises a space to spool the tie down media around the winch shaft, a self-retracting mechanism for the tie down media to self-retract, and a self-retracting mechanism. The self-retracting mechanism can be stopped in a locking state at given length to ensure a tension free tie down media to facilitate its placement. It can be re-engaged from the locking state to rewind the tie down media.

16 Claims, 23 Drawing Sheets

(56) References Cited

U.S. PATENT DOCUMENTS

| | | |
|---|---|---|
| 7,334,972 B2 | 2/2008 | Cash |
| 7,503,736 B1 | 3/2009 | Chen |
| 7,972,099 B2 | 7/2011 | Leggett et al. |
| 8,096,740 B1 * | 1/2012 | Parker .................... B60P 7/083 |
| | | 410/103 |
| 10,145,121 B1 | 12/2018 | Devitt |
| 10,328,842 B2 * | 6/2019 | McNally ............... B60P 7/0846 |
| 10,857,930 B1 | 12/2020 | Levi |
| 2003/0031524 A1 | 2/2003 | Brunet |
| 2007/0264098 A1 * | 11/2007 | Chou .................... B60P 7/083 |
| | | 410/103 |
| 2018/0141479 A1 | 5/2018 | Anderson |
| 2020/0391983 A1 | 12/2020 | Falconer |

\* cited by examiner

SELF-RETRACTABLE WINCH

CROSS-REFERENCE TO RELATED APPLICATION

This application claims priority from U.S. provisional patent application 63/133,259 filed Jan. 1, 2021, the specification of which is hereby incorporated herein by reference in its entirety.

FIELD OF THE INVENTION

The present invention generally relates to the field of cargo securing winches for the transport industry. Specifically, the present invention relates to self-retracting winches, binders and other webbing and cable binders using similar systems mainly used but not limited to secure cargo on transport vehicles beds.

BACKGROUND OF THE INVENTION

Securing cargo on trucks beds and trailers are a standard that remained unchanged for decades using winches, winding and binding webbing or cable, therein referred as tie down media, on sides of the truck or trailer bed or other vehicles to secure the cargo. Once the cargo is removed the operator has to rewind the webbing or cable. Nowadays, the rewinding process has been done by hand or using a crank. The process is time consuming and repetitive movements may be a source of injuries to the operators. Recently, diverse adaptors allow the use of a battery powered drill to accelerate the rewinding process came on the market. These adaptors may attract other kind of problems caused by sudden blockage on the winch at high speed causing the drill to kick or from a whipping action of the tie down media, caused by a too fast winding, leading to other injuries. Furthermore, a battery-operated device that need to be moved at each winch, will need more maintenance and has a higher risk of failure. Some self-retracting winches were designed and marketed. The operators deemed them impractical because of the constant retracting tension that did not allowed them to move the tie down media freely on and over the cargo. It often needed two operators to manage the cargo-tying process. Therefore, there is a need for a self rewinding winch, that may be blocked in a partial un-winded position, reliable, that is not depending on adding another tool that can be lost or forgotten and providing a more controllable rewinding process.

SUMMARY OF THE INVENTION

The present invention includes many aspects and features. The aforesaid and other objectives of the present invention are realized by generally providing a self-retracting cargo winch apparatus and method of use thereof.

The cargo tie down winch includes a rewinding module to improve the rewinding operation time and safety. This apparatus can be locked or deactivated at given lengths in order to have a tension free tie down media.

At least one aspect of the present invention provides self-retracting tie down winch apparatus with a locking mechanism that prevents the rewinding process to engage at any given extension on the tie down media.

At least one aspect of the invention provides standard cargo tie down winch equipped with a self-retracting apparatus with a locking mechanism offering a plurality of states exemplified as follows. Firstly, for instance, an unwinding state where no locking occurs, and the recoil spring is gaining tension. Secondly, a locking state where the unwinding is stopped, the rewinding state is blocked but an unwinding state may be obtained if needed. Thirdly, a free state where the tie down media can either go in unwinding or rewinding/retracting state. And last, a rewinding state where the tie down media is retracted on the apparatus and spooled on the winch shaft by the release of the recoil spring tension.

At least one aspect of the invention provides a management of the different states only by pulling and releasing the tie down media.

At least one aspect of the invention where a separate mechanism is in place to bind the tie down media in order to secure the cargo on the bed of the transport vehicle.

At least one aspect of the invention where the binding mechanism is disposed at the opposite side of the rewinding mechanism.

At least one aspect of the invention provides friction limiting components to reduce overall frictions and increase efficiency of the rewinding process.

At least one aspect of the invention provides a sealed enclosure for the rewinding components.

At least one aspect of the invention provides a sealed enclosure for the rewinding spring and locking mechanism.

At least one aspect of the invention provides a standard hookup to the transport vehicle's frame.

At least one aspect of the present invention provides means of securing many apparatuses together in a ganging manner for transport when not in use.

At least one aspect of the invention provides a tie down media retaining system in order to prevent the tie down media to exit the winch.

In some aspects, the techniques described herein relate to a self-retracting tie down winch for securing a cargo on a vehicle, including: a frame for mounting to the vehicle; a shaft rotatably mounted to the frame adapted to receive a tie down media to be used to secure the cargo, the tie down media being adapted to be wound around the shaft, and urging rotation along with the shaft when the tie down media is wound or unwound; a biasing means fixedly mounted to the shaft, the biasing means being anchored to the frame; wherein upon unwinding the tie down media, rotation of the shaft loads the biasing means, and wherein load accumulated in the biasing means helps rewind the tie down media around the shaft.

In some aspects, the techniques described herein relate to a self-retracting tie down winch, further including a control mechanism able operate in at least two states, including one preventing the tie down media to wind, and one allowing the tie down media to rewind freely under the load accumulated in the biasing means.

In some aspects, the techniques described herein relate to a self-retracting tie down winch, wherein the control mechanism includes a toothed gear and a biased pawl cooperating with the toothed gear.

In some aspects, the techniques described herein relate to a self-retracting tie down winch, wherein toothed gear including a first tooth-free part separating two teethed parts.

In some aspects, the techniques described herein relate to a self-retracting tie down winch, wherein toothed gear including a second first tooth-free part separating the two teethed parts.

In some aspects, the techniques described herein relate to a self-retracting tie down winch, wherein biased pawl has an abutting extremity adapted to penetrate between neighbor teeth of the toothed gear, a second extremity connected to a pawl-biasing means, and a rotation axis located between the abutting extremity and the second extremity.

In some aspects, the techniques described herein relate to a self-retracting tie down winch, wherein biased pawl includes a rounded back face.

In some aspects, the techniques described herein relate to a self-retracting tie down winch, wherein the biased pawl has an abutting extremity and wherein the rounded back face has a radius of curvature allowing the biased pawl when abutting a top of a first tooth of the toothed gear to have the abutting extremity hovering over a neighboring second tooth upon rotation of the toothed gear.

In some aspects, the techniques described herein relate to a self-retracting tie down winch, wherein the biased pawl has a straight face opposed to the rounded back face.

In some aspects, the techniques described herein relate to a self-retracting tie down winch, wherein the teeth have a top and a side, and wherein the control mechanism is operable according to at least three states based on if one of the rounded back face and the straight face is contacting one of the top and the side of one of the teeth.

In some aspects, the techniques described herein relate to a self-retracting tie down winch, wherein the biasing means is a recoil spring.

In some aspects, the techniques described herein relate to a self-retracting tie down winch, wherein the frame has a U-shaped structure having two arms with the tie down media being wound between the arms.

In some aspects, the techniques described herein relate to a self-retracting tie down winch, further including a force-multiplying mechanism connected to the shaft.

In some aspects, the techniques described herein relate to a self-retracting tie down winch, wherein the force-multiplying mechanism includes a first sprocket, a second sprocket and a chain linking the first sprocket and the second sprocket.

In some aspects, the techniques described herein relate to a self-retracting tie down winch, wherein the first sprocket is rotatably mounted to the frame and the second sprocket is fixedly mounted to the shaft.

In some aspects, the techniques described herein relate to a self-retracting tie down winch, further including a drum fixedly mounted to the shaft, wherein the tie down media is wound around the drum.

In some aspects, the techniques described herein relate to a self-retracting tie down winch, wherein the drum includes a hollow cylindrical wall defining a room therein with the biasing means mounted in the room In some aspects, the techniques described herein relate to a vehicle including a cargo bed and a self-retracting tie down winch for securing a cargo on the cargo bet, including: a frame for mounting to the vehicle; a shaft rotatably mounted to the frame adapted to receive a tie down media to be used to secure the cargo, the tie down media being adapted to be wound around the shaft, and urging rotation along with the shaft when the tie down media is wound or unwound; a biasing means fixedly mounted to the shaft, the biasing means being anchored to the frame; wherein upon unwinding the tie down media, rotation of the shaft loads the biasing means, and wherein load accumulated in the biasing means helps rewind the tie down media around the shaft.

In some aspects, the techniques described herein relate to a vehicle, further including a control mechanism including a toothed gear including a first tooth-free portion separating two teethed portions and a biased pawl cooperating with the toothed gear.

In some aspects, the techniques described herein relate to a vehicle, wherein the biasing means is a recoil spring.

The features of the present invention which are believed to be novel are set forth with particularity in the appended claims. Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which.

DETAILED DESCRIPTION

Figure 1:
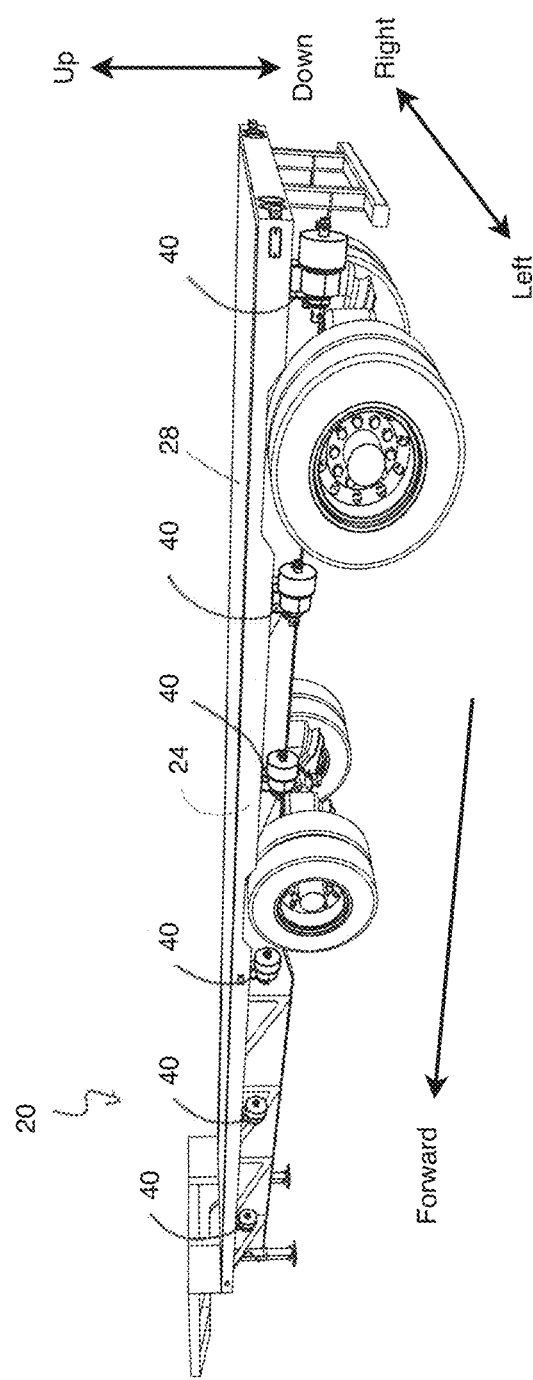
FIG. 1 is showing a perspective rear view of a typical flat bed trailer with a self-retracting tie down winch according to a first embodiment installed.

As a preliminary matter, it will be understood by one having ordinary skill in the relevant art ('Ordinary Artisan') that the invention has broad utility and application. Furthermore, any embodiment discussed and identified as being "preferred" is Considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention discloses herein; only one or a plurality of the features disclosed herein; or combination thereof. As such, many embodiments are implicitly disclosing herein and fall within the scope of what is regarded as the invention.

Accordingly, while the invention is described herein in detail in relation to one or more embodiments, it is to be understood that this disclosure is illustrative and exemplary of the invention and is made merely for purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. II is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein to that which the Ordinary Artisan would understand such term to mean bases on the contextual use of such term herein. To the extent that the meaning of a term used herein-as understood by the Ordinary Artisan based on the contextual use of such term-differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory Provision is intended to and should apply in the interpretation of such claim element. with regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers." "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese.".

Referring the drawings, one or more preferred embodiments of the invention are next described. The following description of one or more preferred embodiments is merely exemplary in nature and is in no way intended to limit the invention, its Implementations, or uses. Hence, a novel ribbed aerodynamic skirt in accordance with principles and embodiments of the present invention will be described herein after.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior Art.

Figure 2:
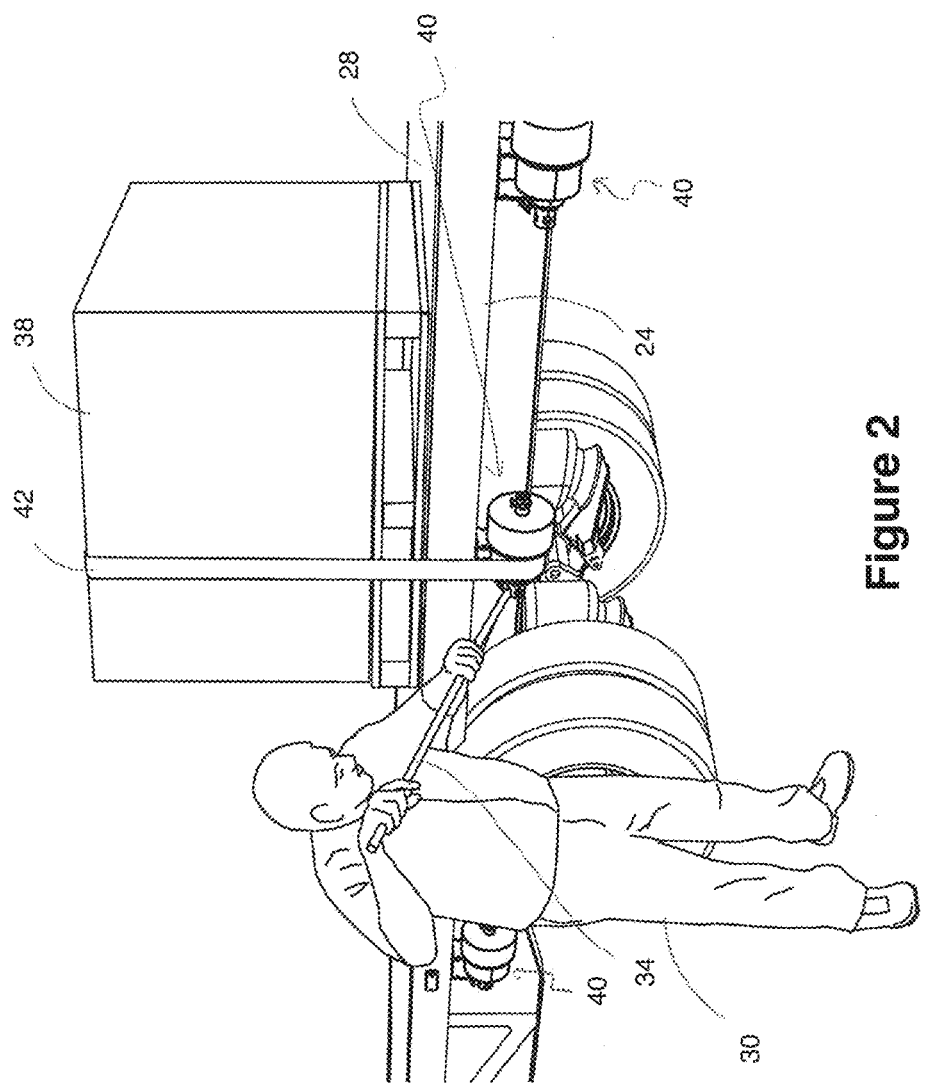
FIG. 2 is showing a perspective view of an operator using the self-retracting tie down winch and binding tie down media to secure the cargo.

FIG. 1 and FIG. 2 illustrate a typical transport vehicle 20, equipped with the self-retracting tie down winch 40 (hereinafter SRTDW 40). The transport vehicle may be any kind of moving vehicle with a space for cargo with the need of a tie down system to secure a cargo. The hereby embodiment is represented on a flatbed trailer.

The SRTDW 40 are secured the left side frame 24 by welding, bolting or any other way known to those skilled in the art. It is important to note that the SRTDW 40 may be placed in either or both sides of the transport vehicle without departing from the scope of the invention. The SRTDW 40 may also be secured on rails (not shown) in order to be moved longitudinally along the left side frame 24 to allow a better placement of the tie down media 42 in order to effectively secure the cargo.

Figure 3:
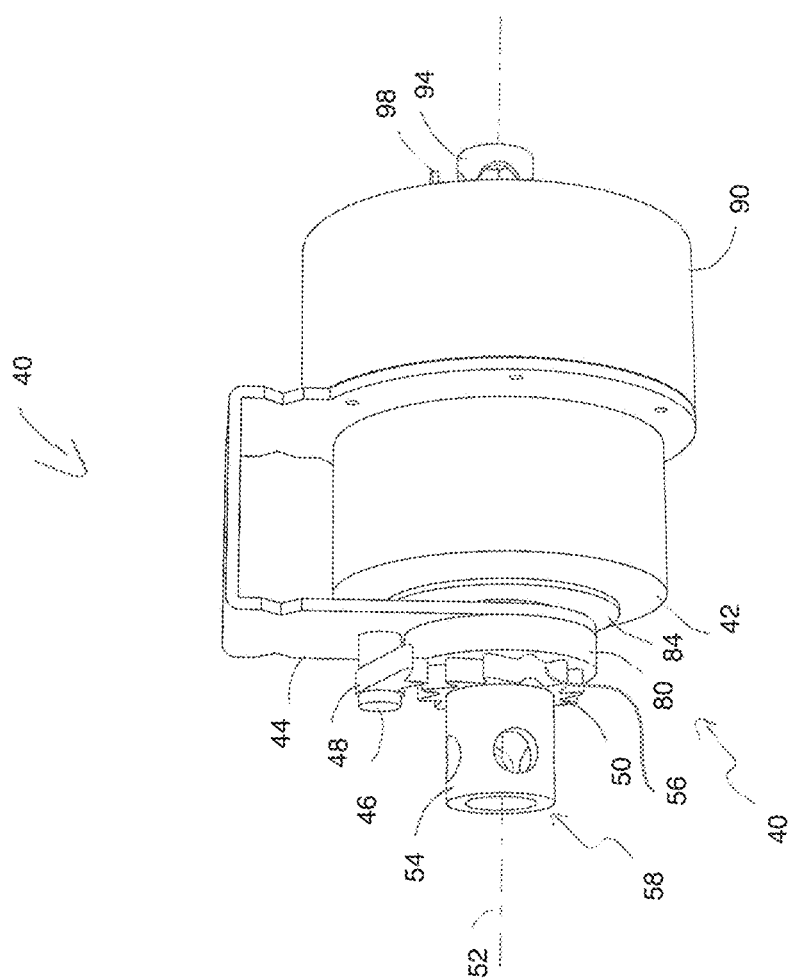
FIG. 3 is showing a front elevational view of an embodiment of the self-retracting tie down winch.

To understand prior art, FIG. 3 is used for reference. In prior art, when the operator 30 needs to secure a cargo, the operator 30 has to move the binding pawl 48 away from the binding gear 50, to pull the tie down media 42 sufficiently to reach the opposite side of the vehicle or attachment point. After, the operator 30 has to take up the slack from the tie down media 42 and then use a binding means represented here as a winch bar 34 to finally secure the cargo on the vehicle bed 28. Once the cargo removed, the tie down media has to be either removed completely from the winch or rolled by hand. Both methods are time consuming even when removing media since it has to be stored in an orderly manner.

In the present invention, the operator 30 has to put the binding pawl 48 away from the binding gear 50, pull the needed length of tie down media and find a locking state of the SRTDW 40. The different states of the SRTDW 40 are explained in further details. Then, attach the end of the tie down media 42 to the determined point. Slightly pull on the tie down media 42 to engage in the rewinding state, this takes up the slack automatically on the tie down media and then, the operator 30 may proceed to secure the cargo on the vehicle bed 28 as done in prior art. Once the cargo untied and removed, with the binding pawl 48 away from the binding gear 50, the operator 30 simply needs to guide the tie down media 42 in the winch since it's already in a rewinding state.

FIG. 3 illustrates one embodiment of the invention. Other embodiments such as, but not limited to, a right-side winding winch, different tie down medias or binding methods, are contemplated within the scope of the invention. The SRTDW 40 is assembled around a winch frame 44 having a U-shape comprising two arms extending downward from a central section. The winch frame 44 is secured through the central section to the bed of the transport vehicle 20 using known methods to those skilled in the art. On its left side, the winch driver 54, used conjointly with a winch bar 34 (FIG. 2), operates rotationally the winch shaft 58 when securing a cargo. The tie down media 42 is axially spooled around the winch shaft 58 having axis 52, generating a pulling force between the transport vehicle 20, the cargo 38 and the SRTDW 40. The high tension generated is then maintained with the binding gear 50 that is affixed to the winch shaft 58 by the binding pawl 48 engaging in one of the tooth 56 of the binding gear 50.

On the left side of the winch frame 44, the rewinding mechanism 74 (not shown) is protected by a rewinding mechanism enclosure 90 preferably hermetically sealing the mechanism to protect it from particles, water and other contaminants encountered during transport. A completely enclosed mechanism ensures long term reliability. In this embodiment, at the end of the rewinding mechanism enclosure 90, a gang connector 94 is welded. This gang connector 94 allows multiple SRTDW 40 to be connected and secured with a lock pin 98 when they are not in use. This feature is used when plural SRTDW 40 are affixed to a rail and there's a need to regroup the winches at the same place for further use.

Figure 4:
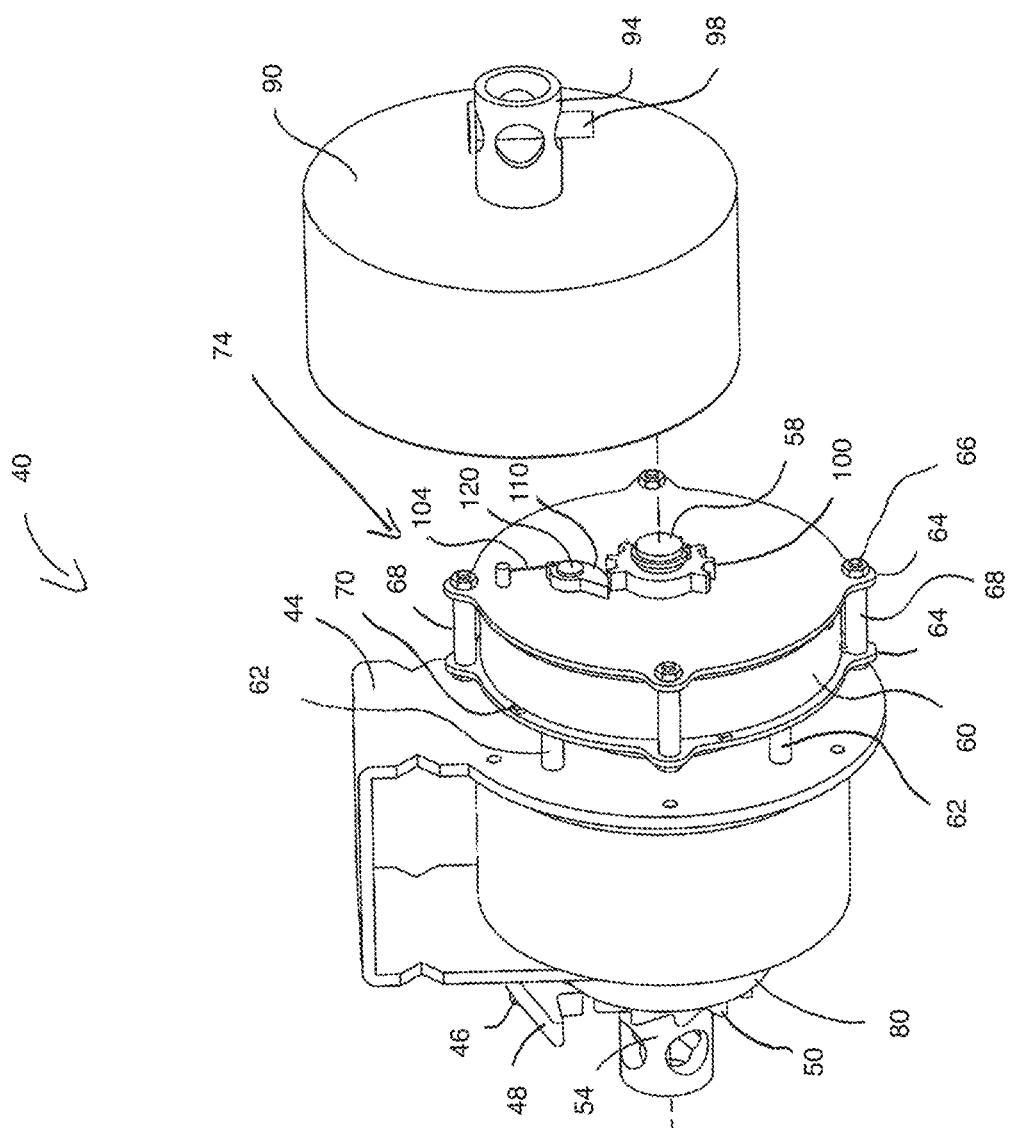
FIG. 4 is showing a front perspective view of the self-retracting tie down winch with the rewinding mechanism enclosure removed.
Figure 5:
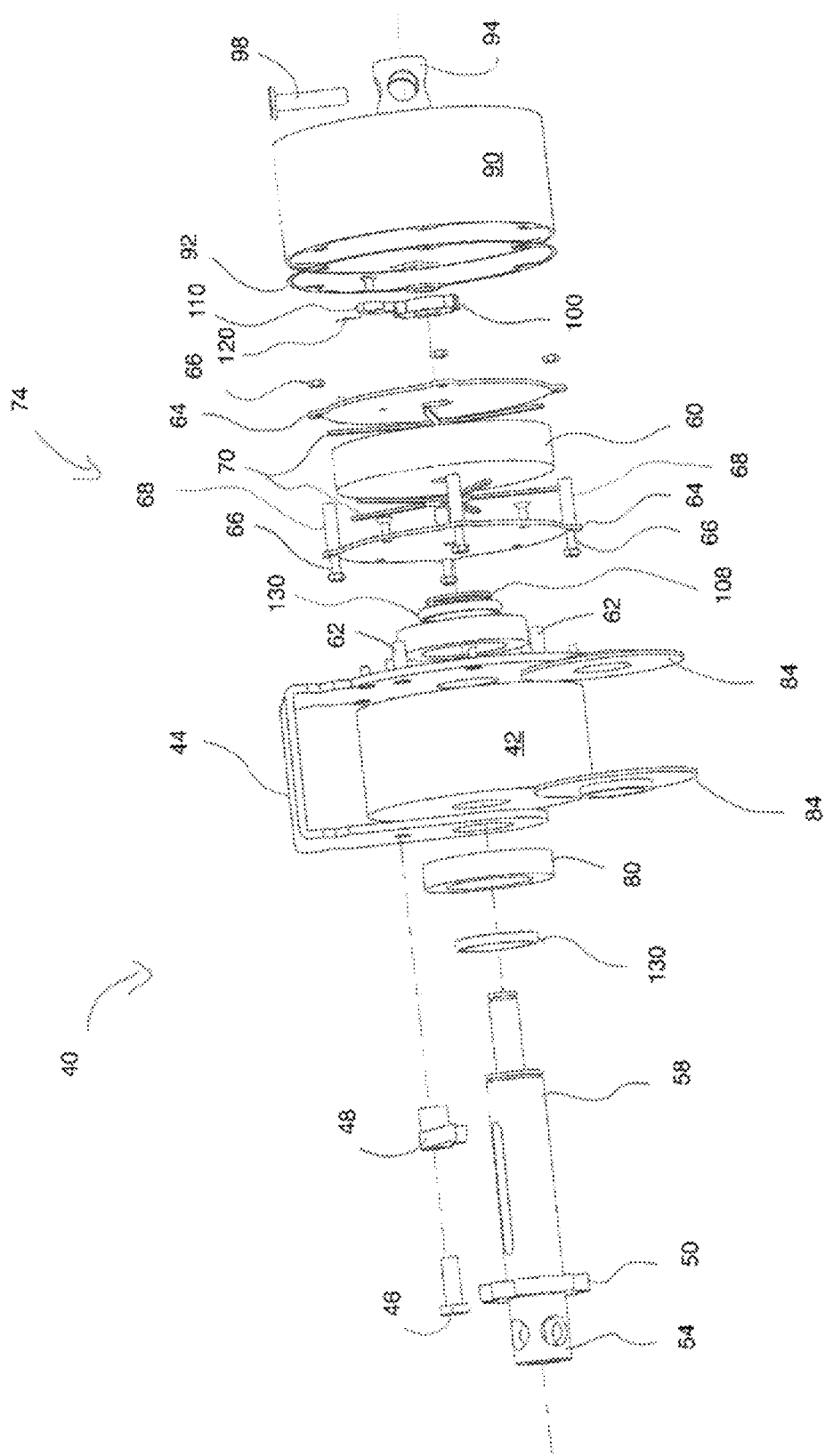
FIG. 5 is showing an exploded view of the self-retracting tie down winch.

Moving now to FIG. 4 and FIG. 5 showing the rewinding mechanism enclosure 90 have been removed in order to show the rewinding mechanism 74 of the embodiment and exploded view of the embodied tie down winch. One of the holder plates 64 of the mechanism is secured to the winch frame 44 using fasteners and spacers 62. The second holder plate 64 is secured to the first one with fasteners 66 and spacers 68. In the room defined in-between the spacers 68, the recoil spring 60 (La, biasing means), in this embodiment, represented as a spiral spring, is operatively connected to the winch shaft 58 and its friction is reduced by the means of a pair of thrust bearings 70. One thrust bearing 70 is affixed to the interior part of each holder plate 64. Furthermore, the recoil spring 60 is also anchored, i.e., connected the one of the spacers 68 to retain the rotational force accumulated when the tie down media 42 is extracted, thus loading the recoil spring 60. At the end of the mechanism, the spring 104, pawl 110 and gear 100 which is axially connected to the winch shaft 58, constituting the locking mechanism, aka control mechanism, of the rewinding mechanism 74.

Visible on FIG. 5, the winch shaft 58 is supported by sealed bearings 130 inside bearing brace 80 and retained in place with a collar 108 (when needed) to reduce rotational friction. Also to reduce friction, a pair of guide plates 84 are used between the winch frame 44 and tie down media 42. Another friction reducing component can be observed. Between the holder plates 64 and the recoil spring 60, the spring thrust bearings 70 are affixed to the holder plate's interior sides. The sealing of the rewinding mechanism 74 is then completed by a gasket 92 or by any other means of sealing.

FIGS. 6, 7, 8 and 9 depict the plurality of states (4) of the locking mechanism.

Figure 6:
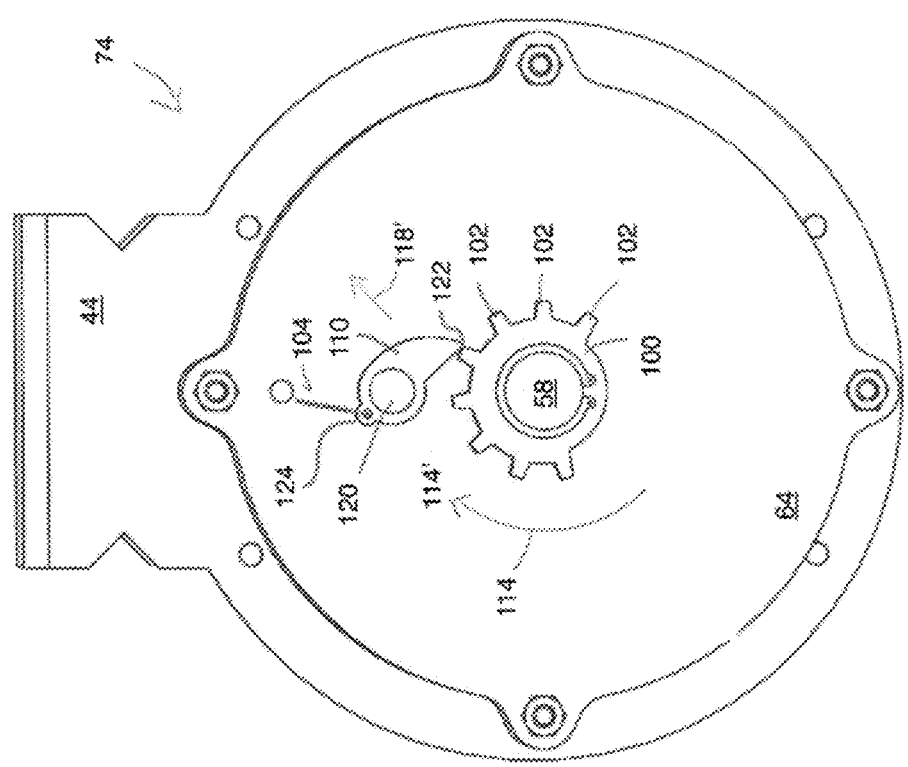
FIG. 6 is showing a right elevational view of the locking mechanism in an unwinding state.

Unwinding state. The first state depicted in FIG. 6 is an unwinding state where the tie down media 42 (not shown) can be freely extracted by an operator to secure a cargo. In this embodiment and according to depiction, the unwinding state is in a clockwise rotation 114'. The extraction of the tie down media 42 induces a clockwise rotation 114' to the winch shaft 58. The gear 100, axially connected to the winch shaft 58, rotates about the winch shaft 58. The abutting extremity 122 of the pawl 110 is lifted by the gear tooth in direction 118' in a rotational movement around the pivot 120. The spring 104, connected to the opposed extremity 124 of the pawl 110, keeps a bias on the pawl 110 towards the gear 100. The extraction of the tie down media 42 in the unwinding state winds up the recoil spring 60 (not shown) so that the recoil spring 60 gains tension.

Figure 7:
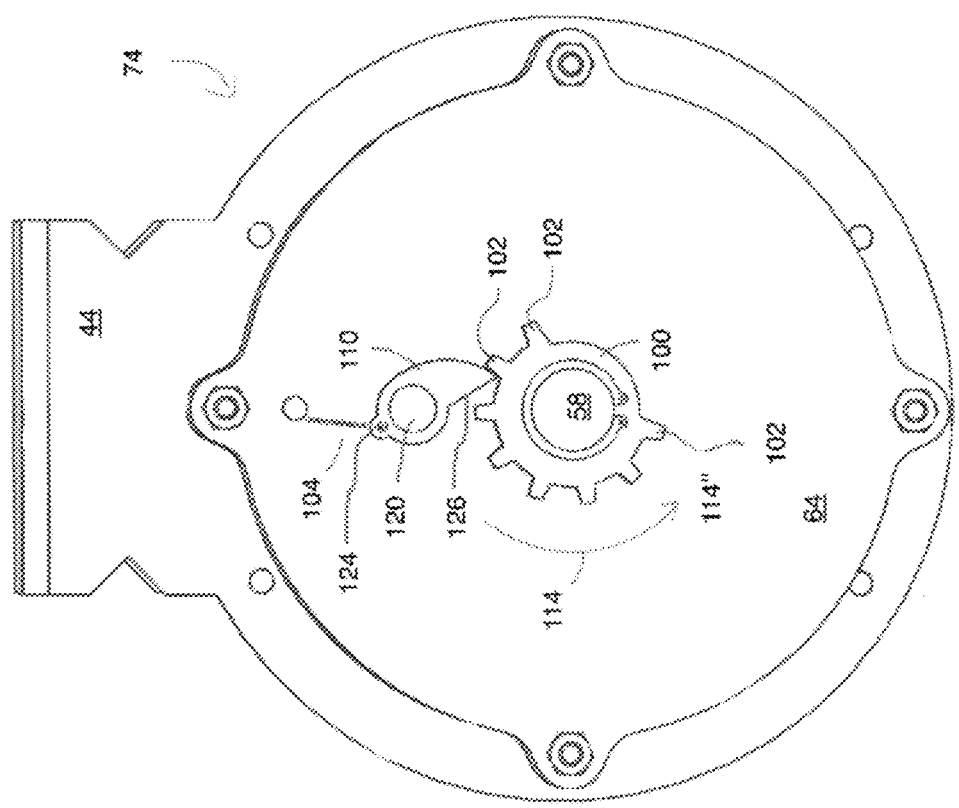
FIG. 7 is showing a right elevational view of the locking mechanism in a locked state.
Figure 8:
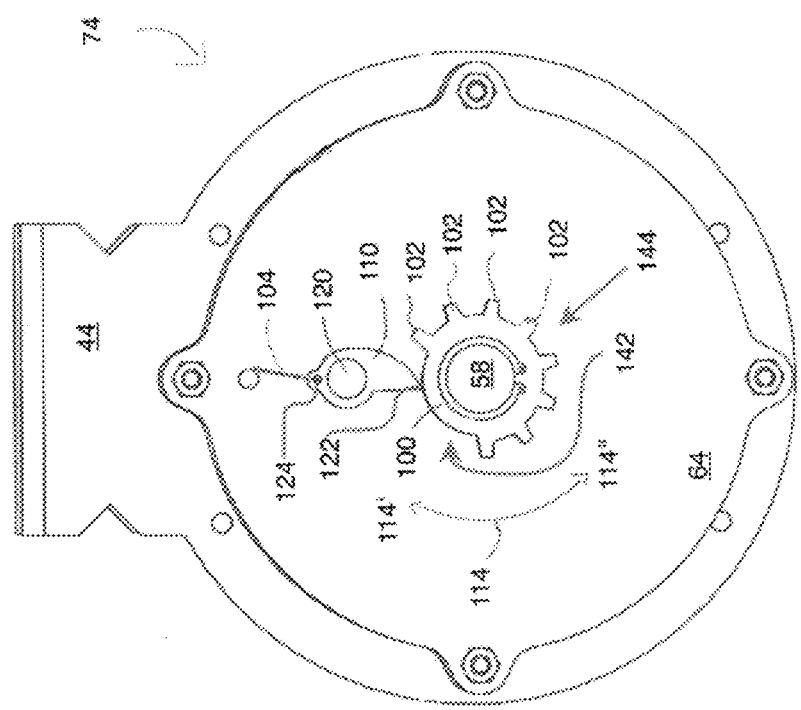
FIG. 8 is showing a right elevational view of the locking mechanism in a free state.

Locking state. In FIG. 7, upon release of the tie down media 42, the recoil spring 60 releases tension and induces a counter-clockwise rotation 114". If the abutting extremity 122 of the pawl 110 is within a toothed part of the gear 100, as seen in FIG. 7, the rewinding mechanism 74 engages in a locking state wherein the tie down media 42 is prevented to retract in the winch. With a counter-clockwise rotation 114", the spring 104 pulls the opposed extremity 124 of the pawl 110, inducing the abutting extremity 122 of the pawl 110 to enter between teeth 102 and to move towards the deepest point of the gear. Therein, the rounded back face 128 of the pawl 110 abuts against the gear tooth 102 where it locks the winch shaft 58 against further counter-clockwise rotation 114" while the slope of the straight portion 126 maintains a possible clockwise rotation 114' of the winch shaft 58. The locking state allows an operator to move the tie down media 42 to the desired position without being bothered by the retracting tension. The locking state also allows an operator to extract more tie down media 42 if needed.

When the end of the tie down media 42 is secured to, e.g., the other side of the vehicle bed, thus the cargo is ready to be secured, the locked state is not needed anymore. Before binding the media to secure the cargo, the apparatus needs to pass in the rewinding state.

Free state. In order to pass to the rewinding state, the locking mechanism needs to be in a free state depicted in FIG. 8, wherein the pawl 110, the abutting extremity 122 in the toot-free part, allows either a clockwise rotation 114' or a counter-clockwise rotation 114". In this tooth-free part 142 of the gear tooth 102, the spring 104 can pull the pawl 110 into a neutral position wherein the straight portion 126 is about parallel to a line joining the center of the winch shaft 58 and the center of the pivot 120 of the pawl 110. If a clockwise rotation 114' is induced, the straight portion 126 of the pawl 110 is rubbed against the first encountered teeth 102 of the gear 100 and following ones, hence entering an unwinding state (when rotating, e.g., FIG. 6) and a locking state (once stopped, e.g. FIG. 7) in which the straight portion 126 of the pawl 110 is inserted between tooth 102 of the toothed portion 144 of the gear 100.

Figure 9:
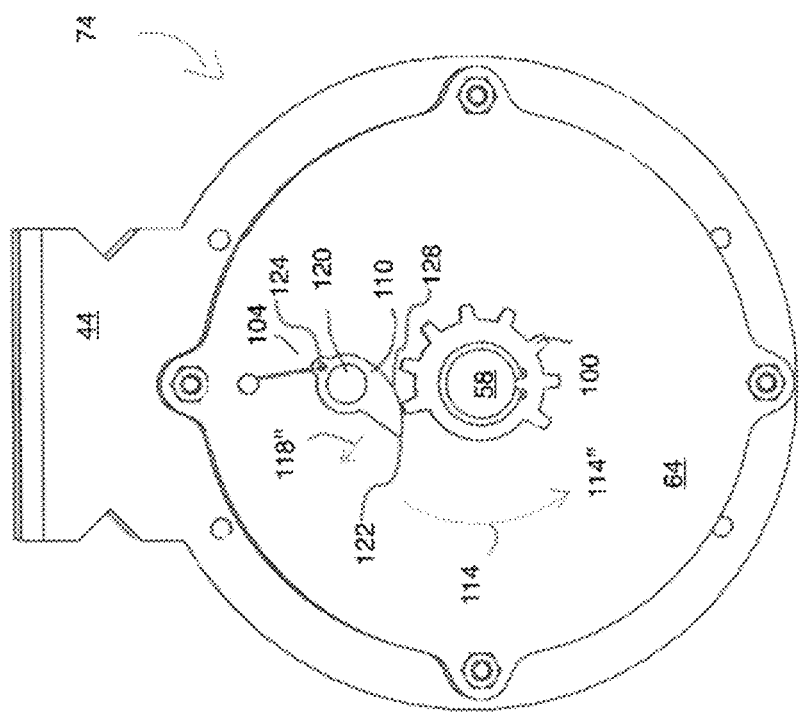
FIG. 9 is showing a right elevational view of the locking mechanism in a rewinding state.
Figure 10:
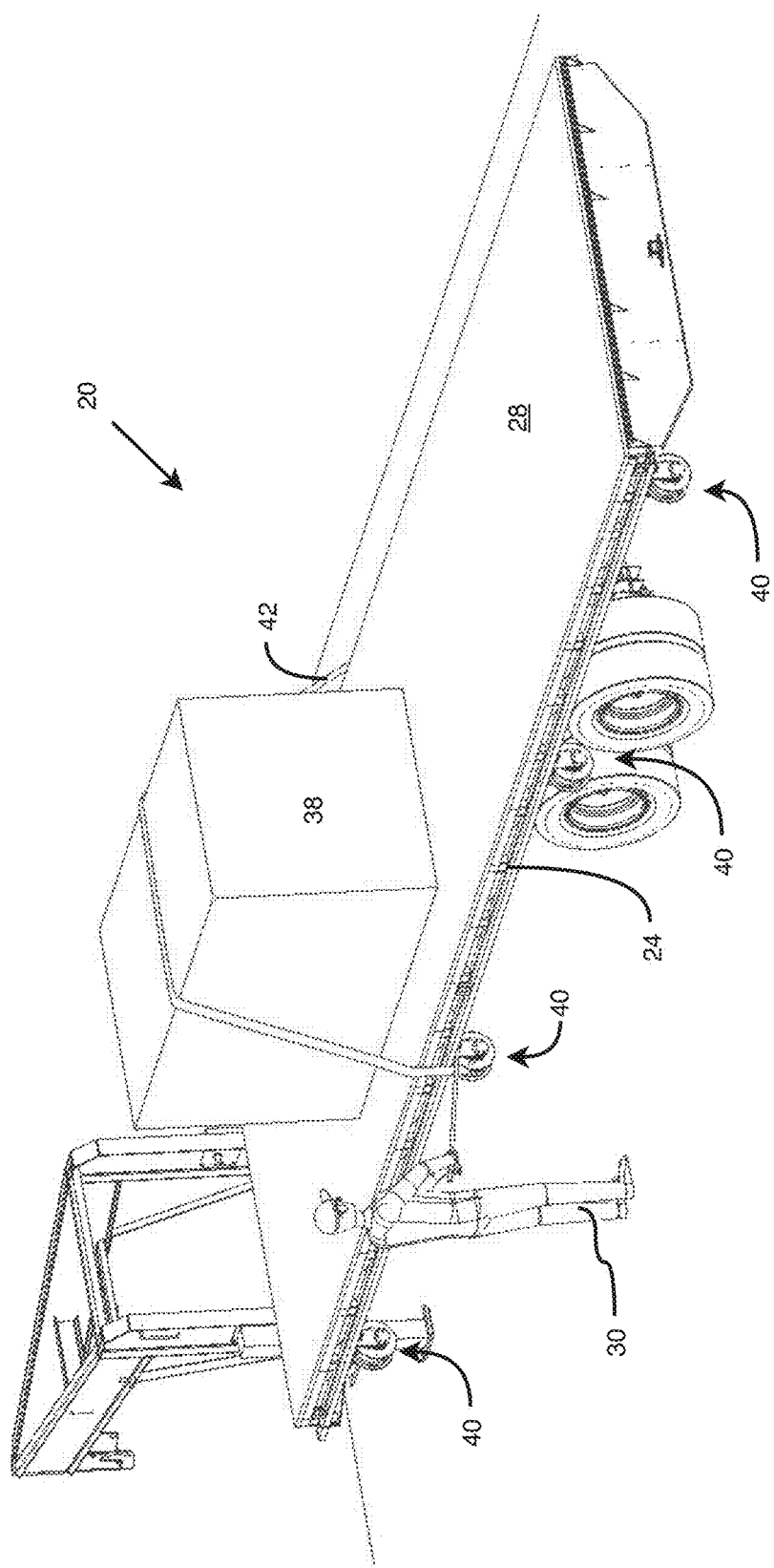
FIG. 10 is showing a perspective rear view of a typical flat bed trailer with the self-retracting winch apparatus installed in accordance with another embodiment.
Figure 11:
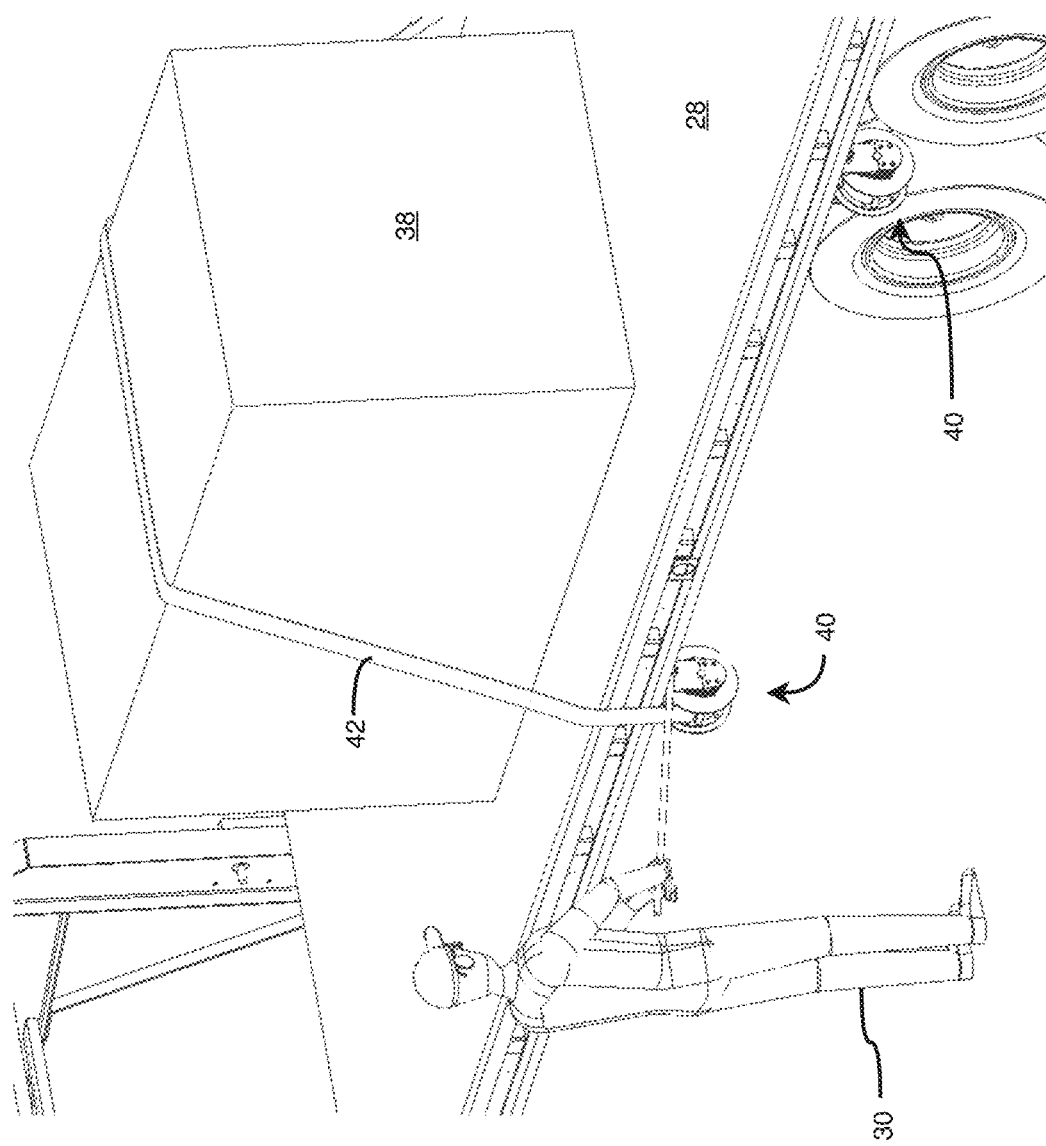
FIG. 11 is showing a perspective view of an operator using the self-retracting tie down winch depicted on FIG. 10 and binding tie down media to secure the cargo.
Figure 12:
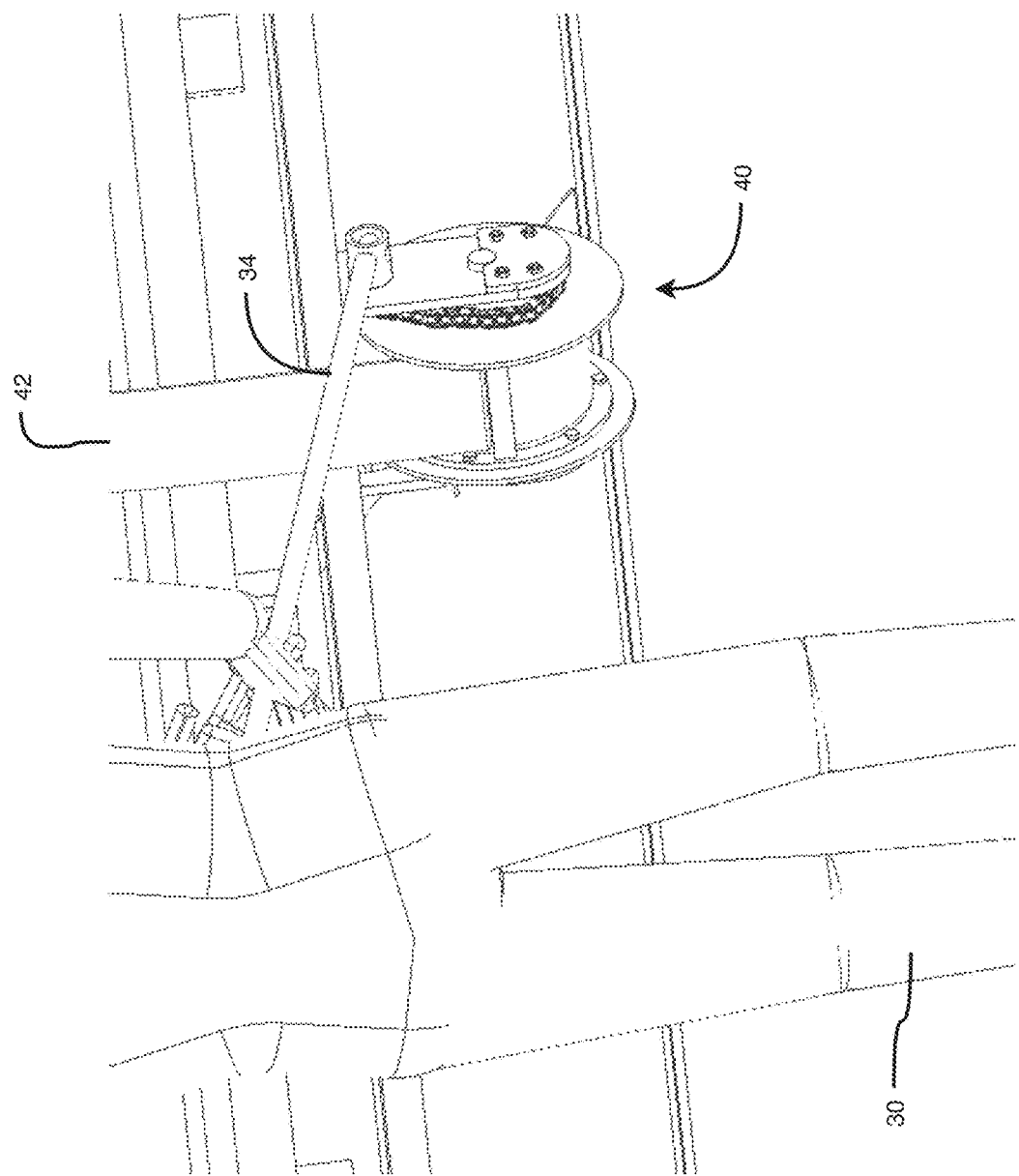
FIG. 12 is a sectional perspective view of the operator using the self-retracting tie down winch depicted on FIG. 11.
Figure 13:
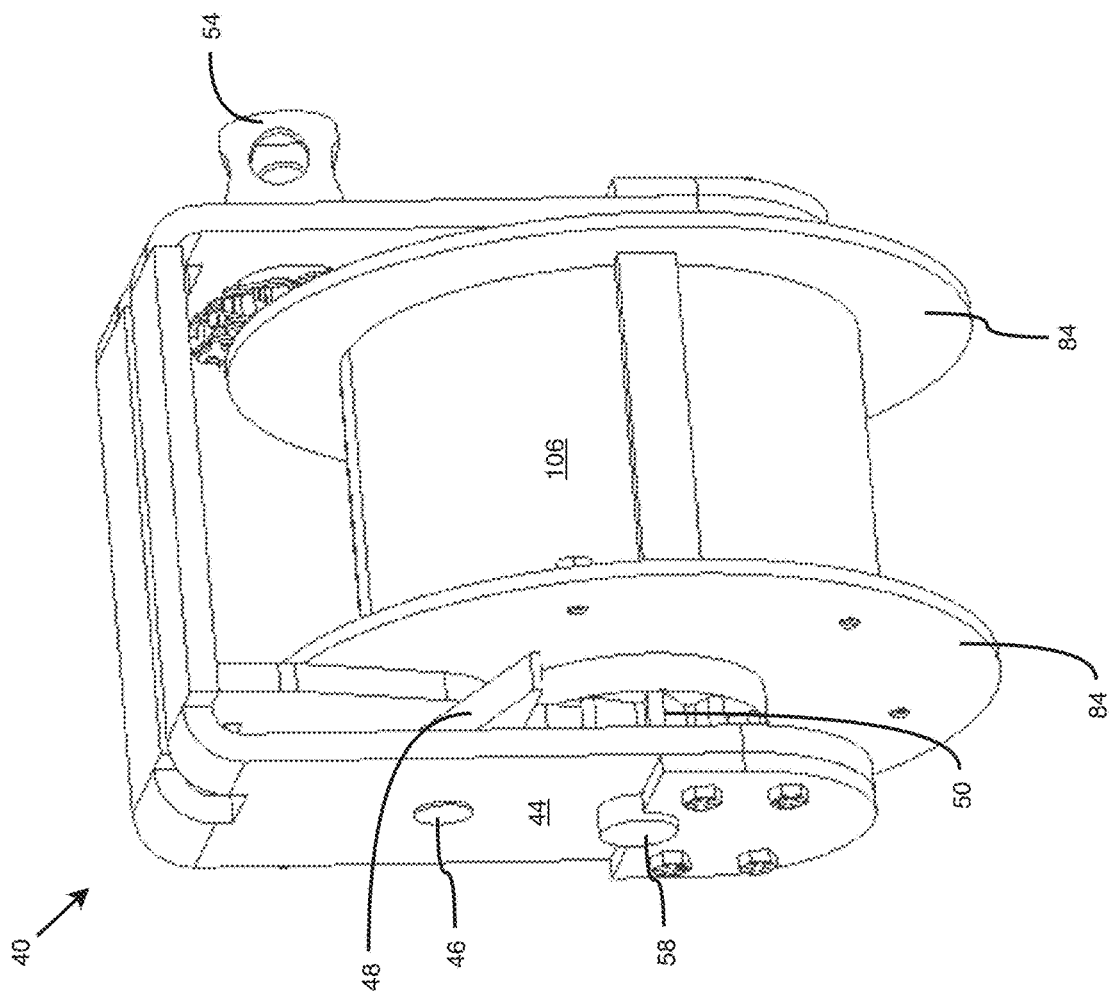
FIG. 13 is a front elevation view of the self-retracting tie down winch of FIG. 11.
Figure 14:
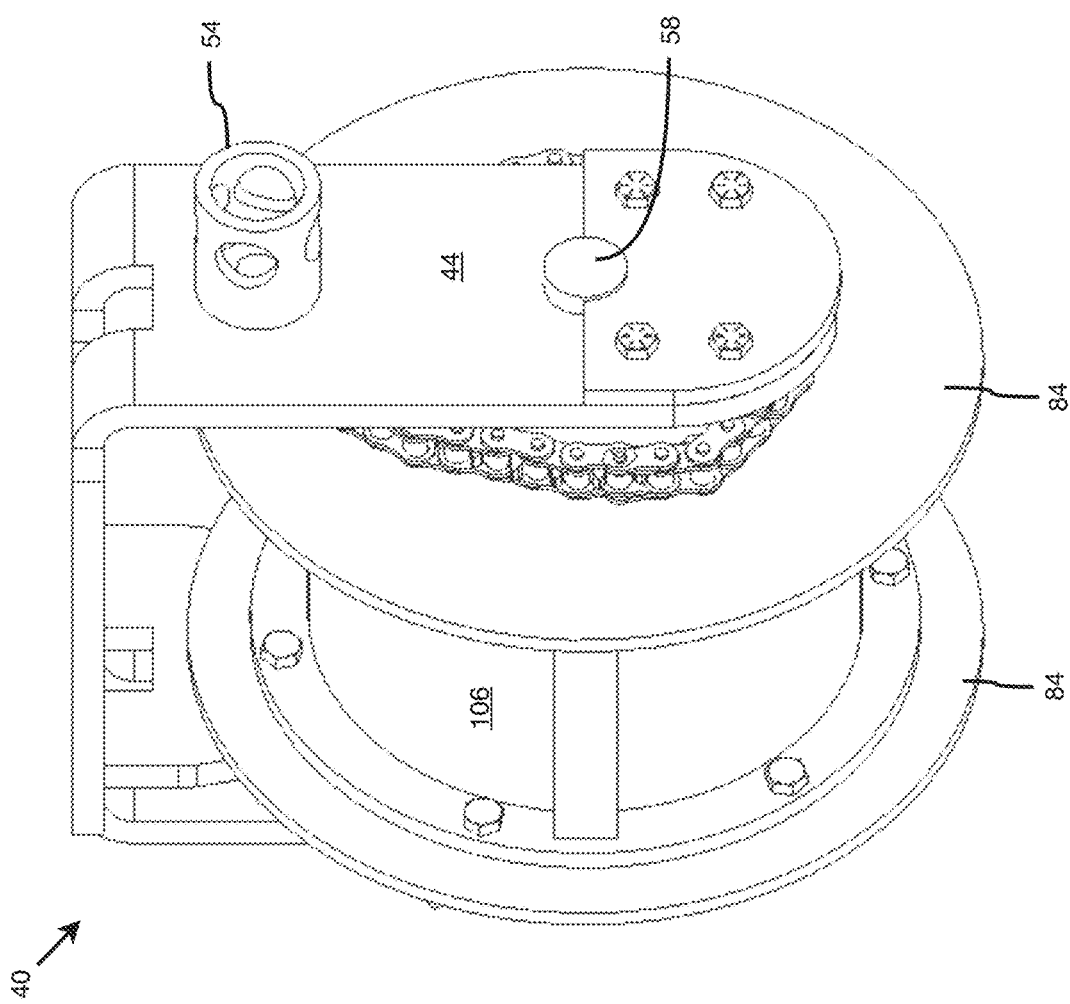
FIG. 14 is a right-side elevation perspective view of the self-retracting tie down winch of FIG. 11.
Figure 15:
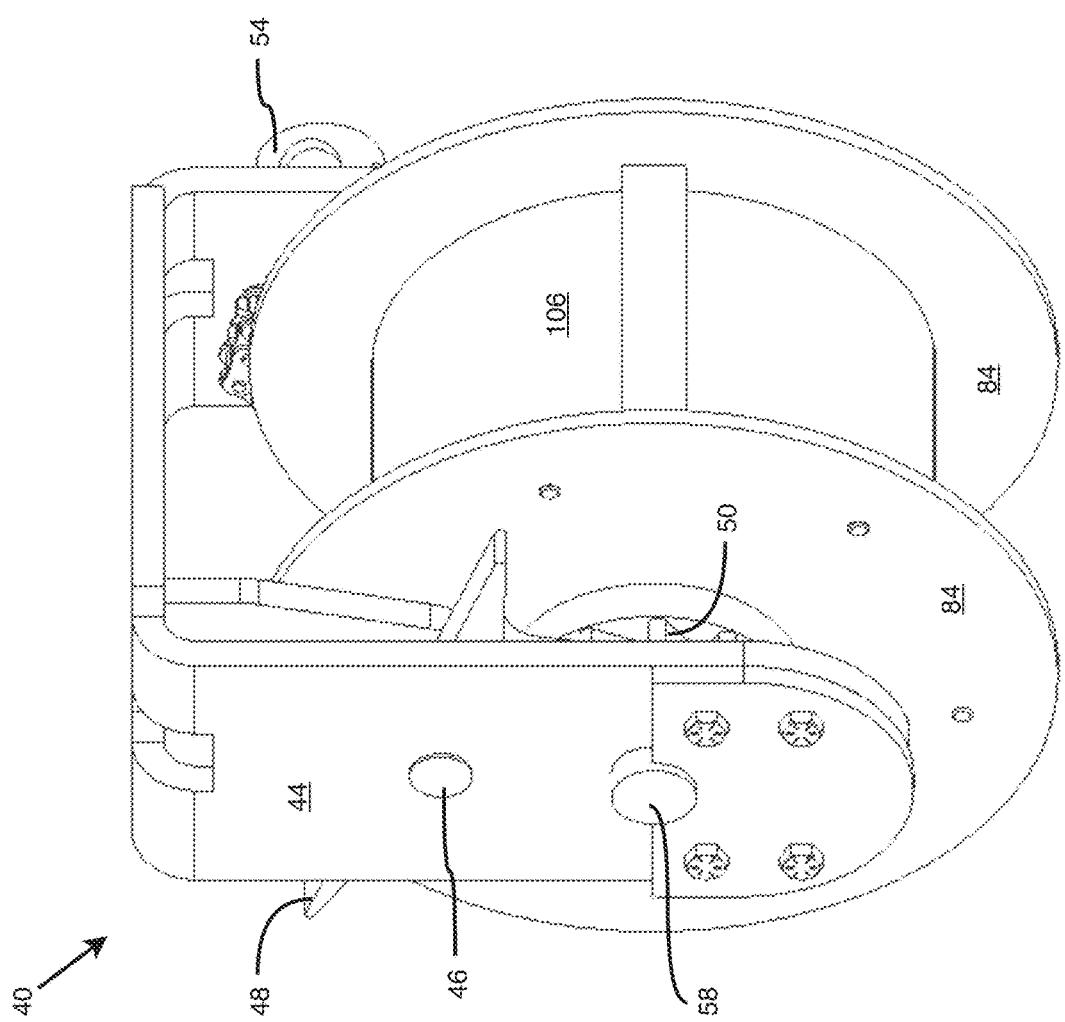
FIG. 15 is a left-side elevation perspective view of the self-retracting tie down winch of FIG. 11.
Figure 16:
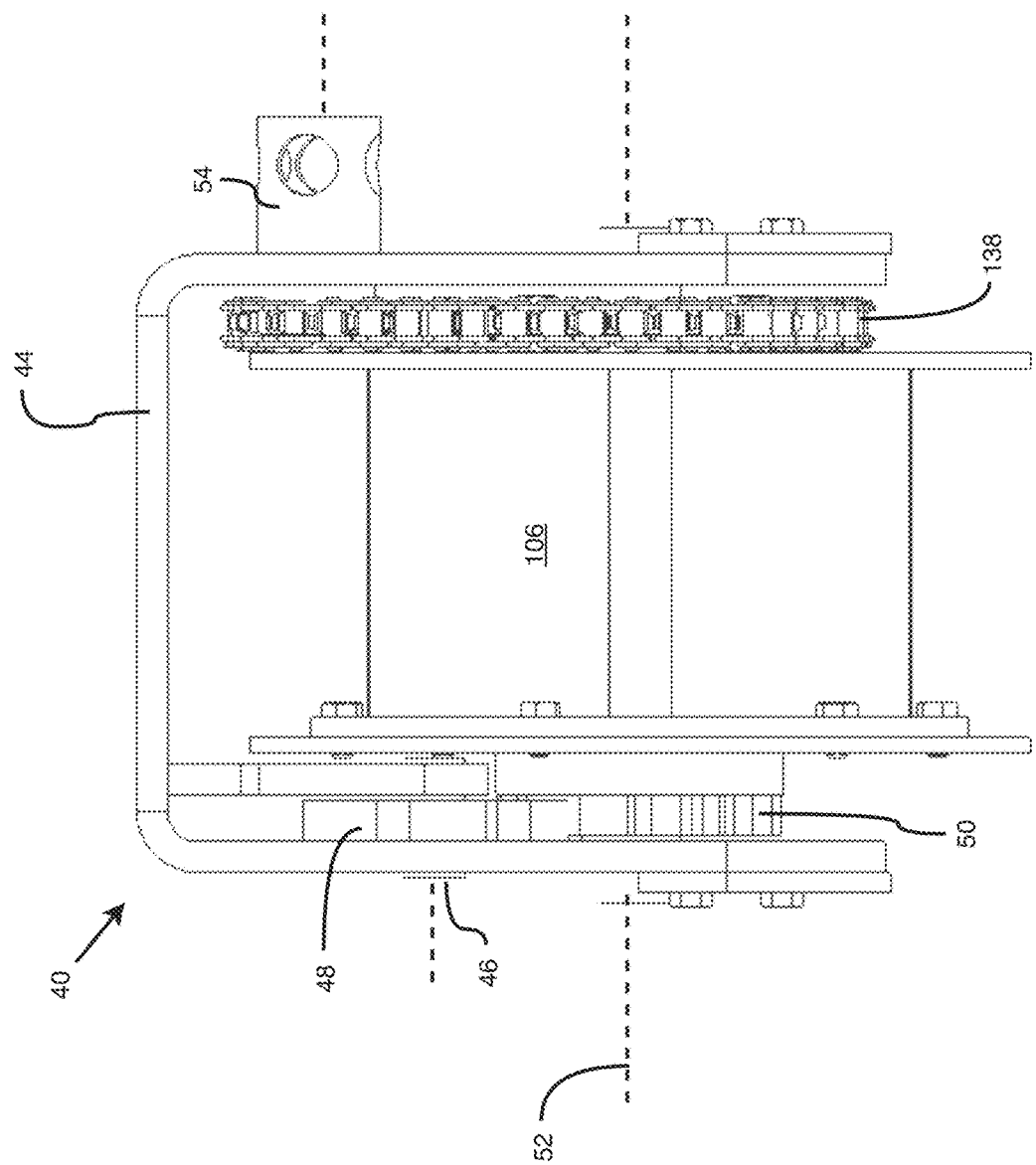
FIG. 16 is a front view of the self-retracting tie down winch of FIG. 11.
Figure 17:
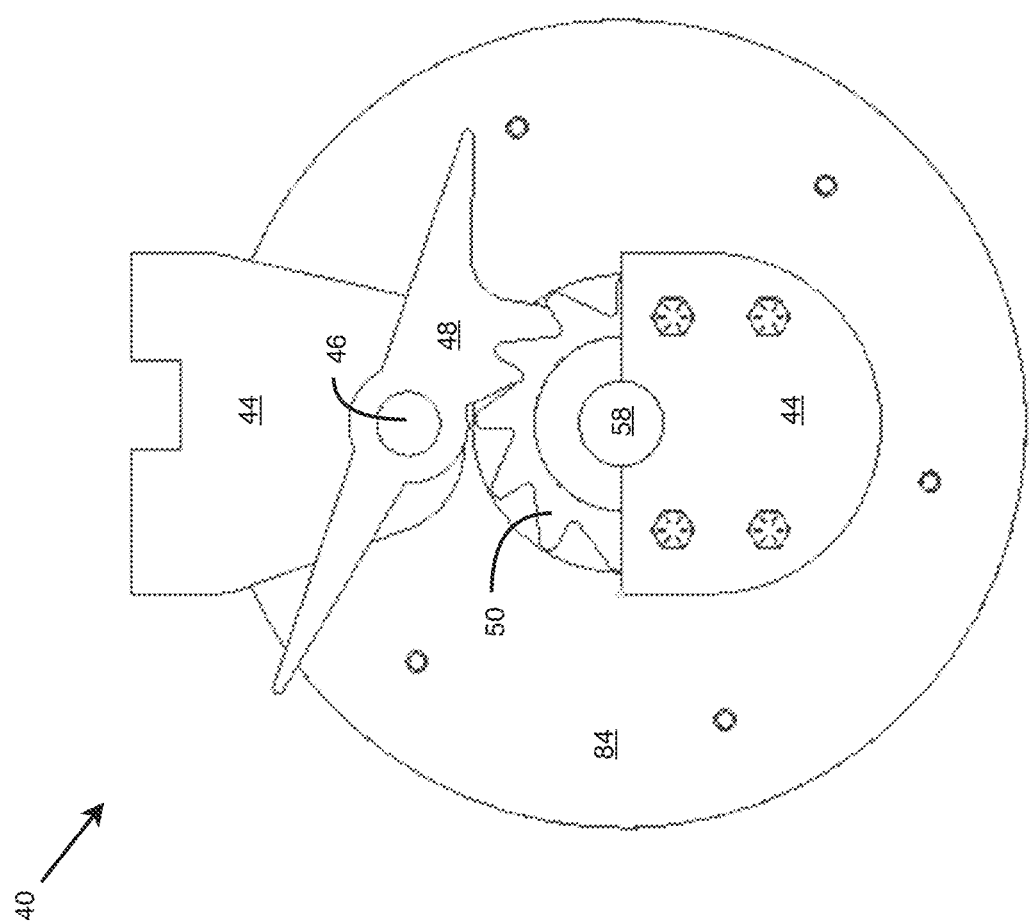
FIG. 17 is a right side view of the self-retracting tie down winch of FIG. 11 with a portion of the frame removed.
Figure 18:
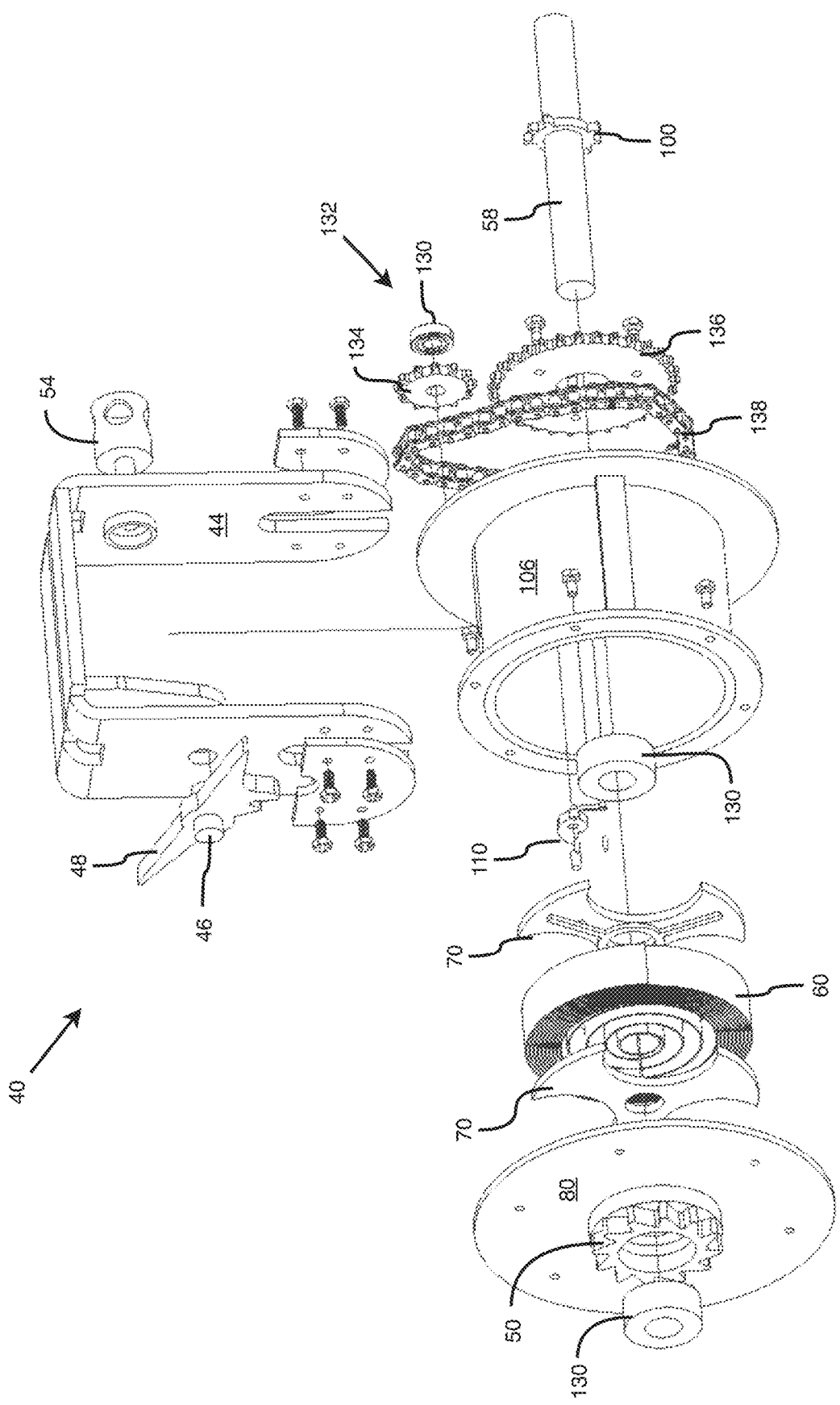
FIG. 18 is a left side exploded perspective view of the self-retracting tie down winch of FIG. 11.
Figure 19:
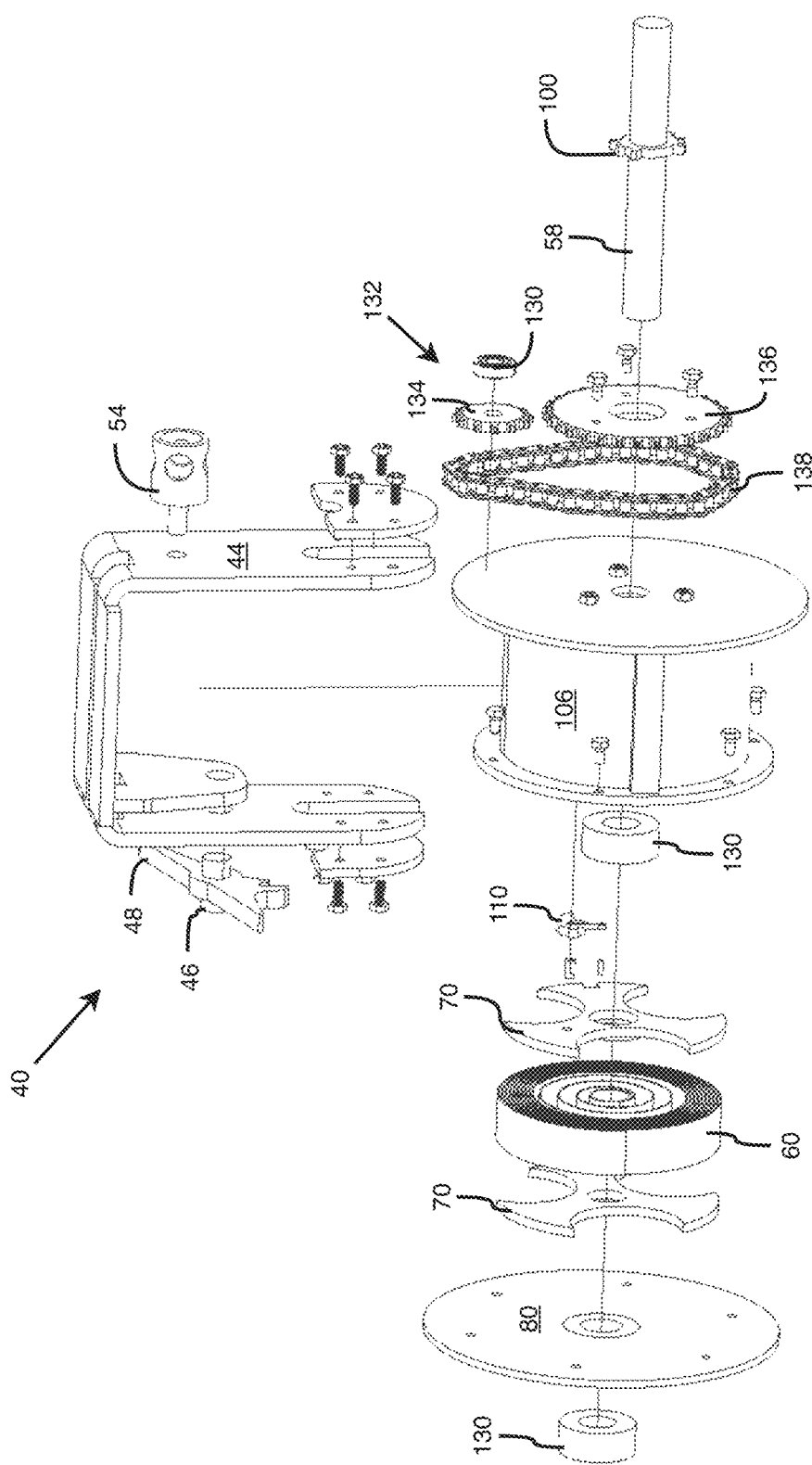
FIG. 19 is a right side exploded perspective view of the self-retracting tie down winch of FIG. 11.
Figure 20:
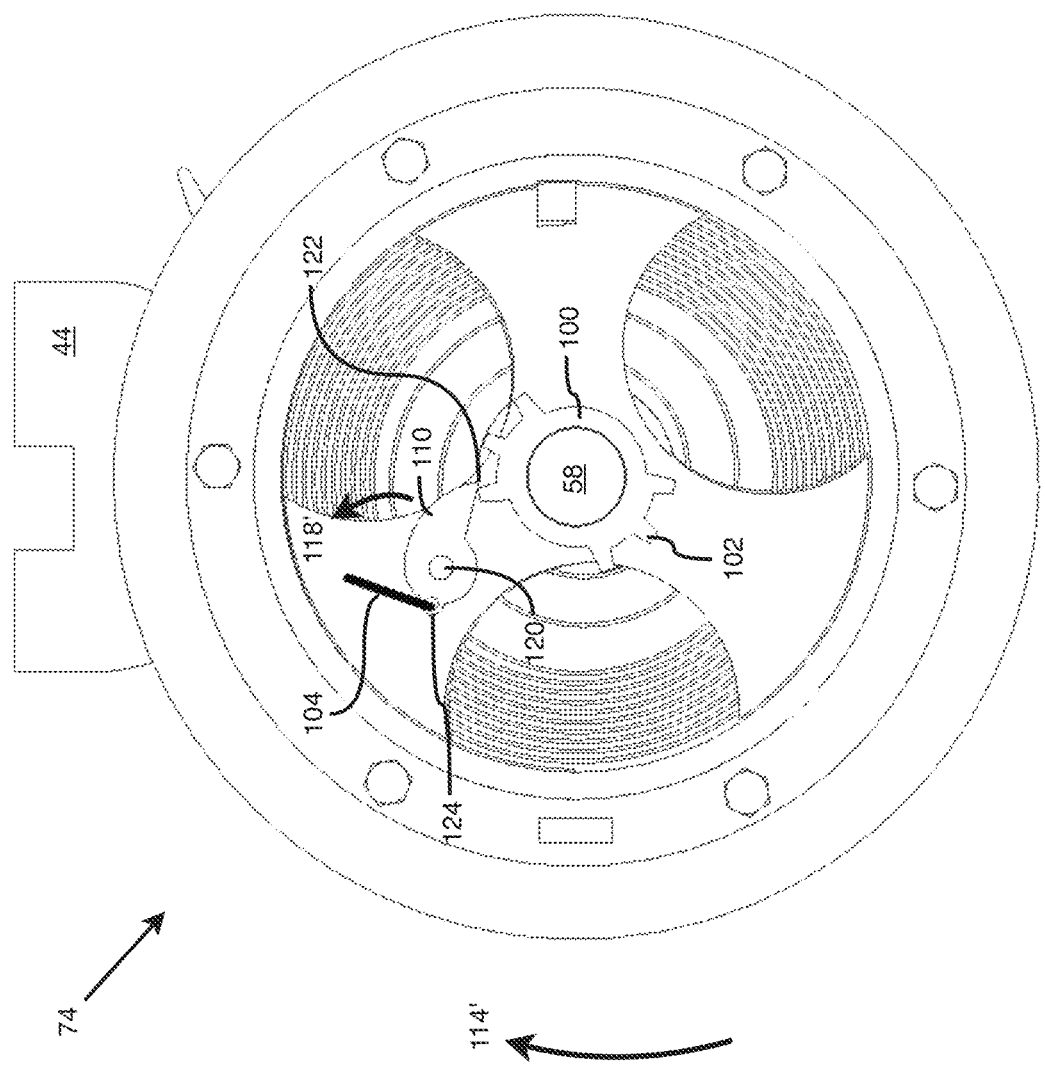
FIG. 20 is showing a right elevational view of the locking mechanism in an unwinding state of the self-retracting tie down winch of FIG. 11.
Figure 21:
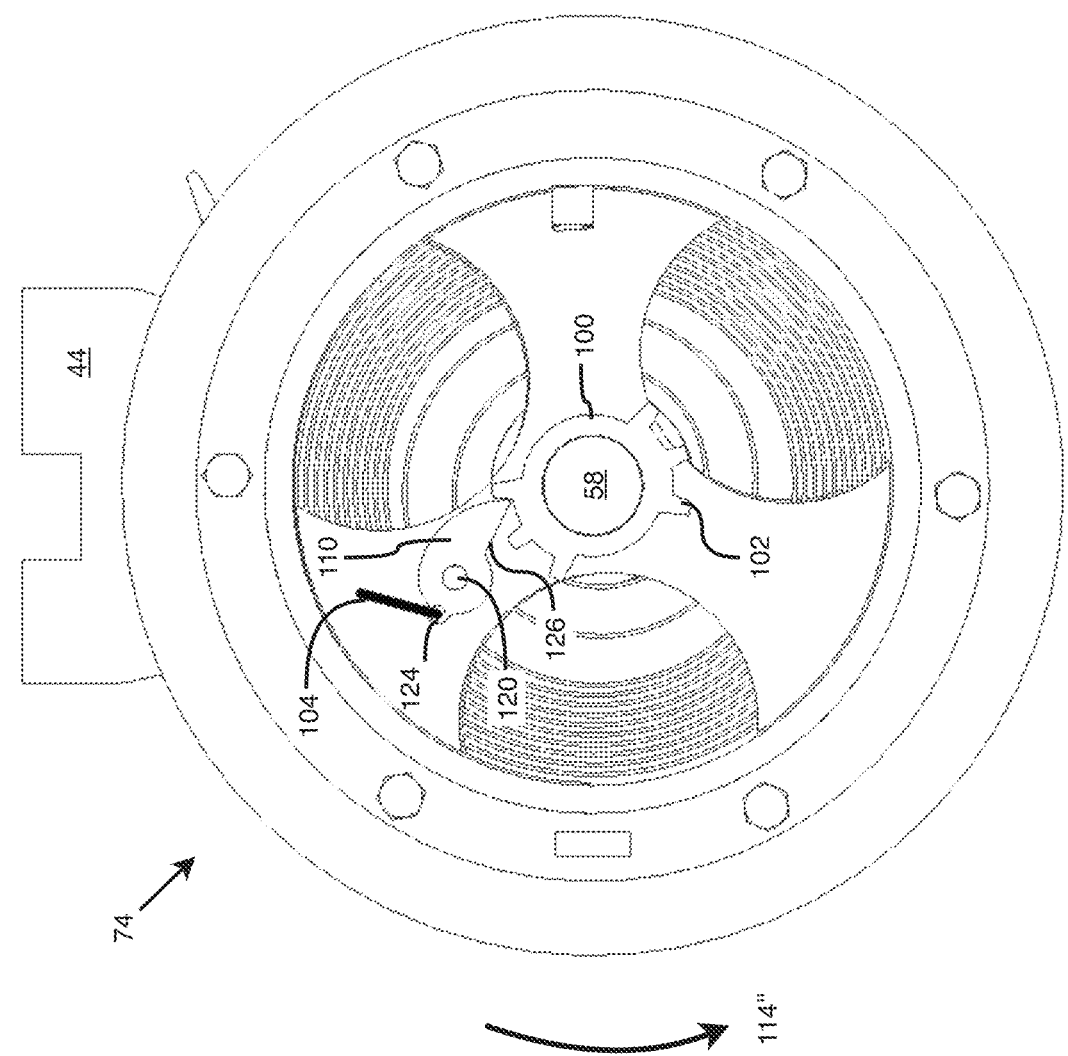
FIG. 21 is showing a right elevational view of the locking mechanism in a locked state of the self-retracting tie down winch of FIG. 11.
Figure 22:
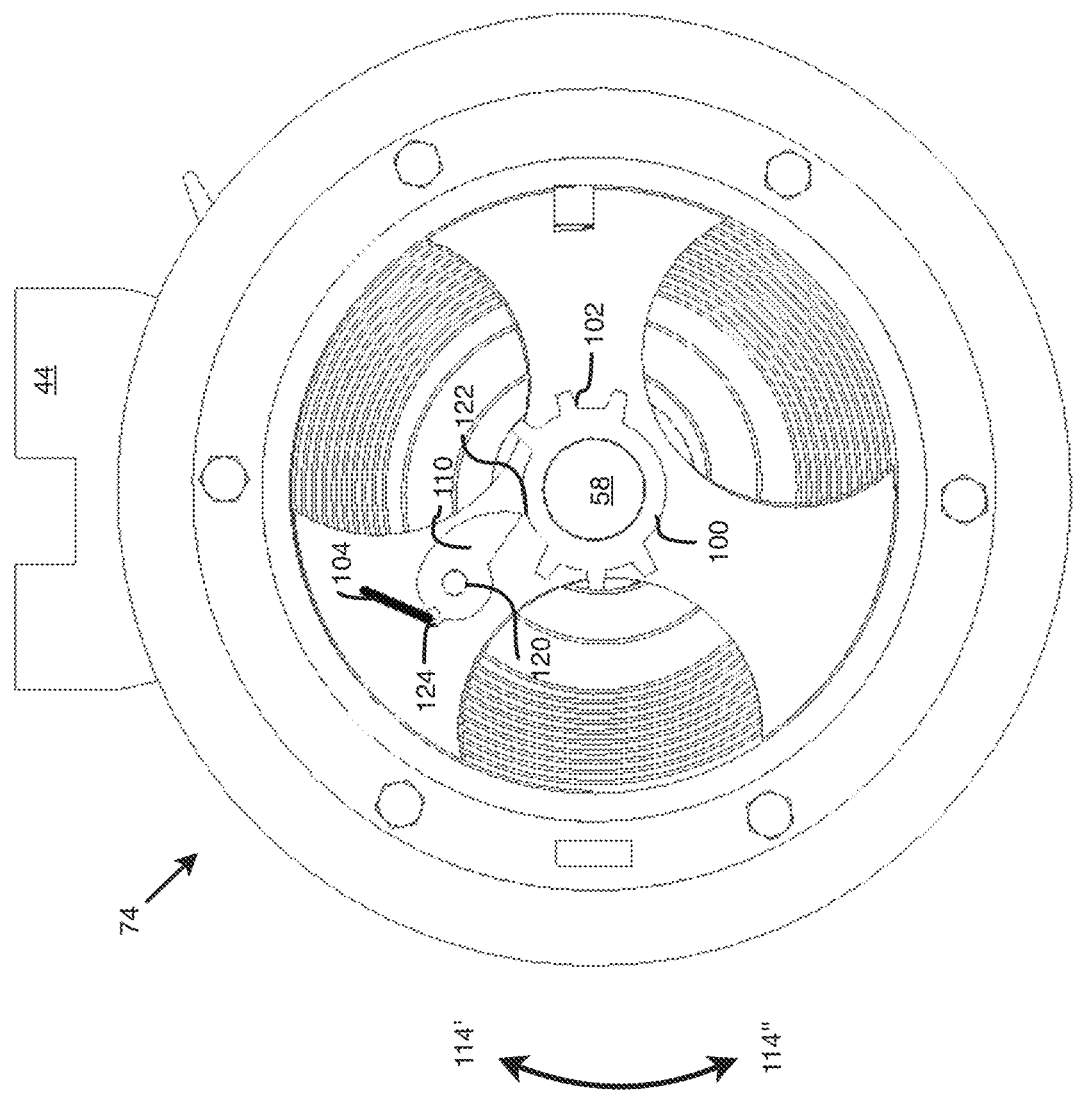
FIG. 22 is showing a right elevational view of the locking mechanism in a free state of the self-retracting tie down winch of FIG. 11.
Figure 23:
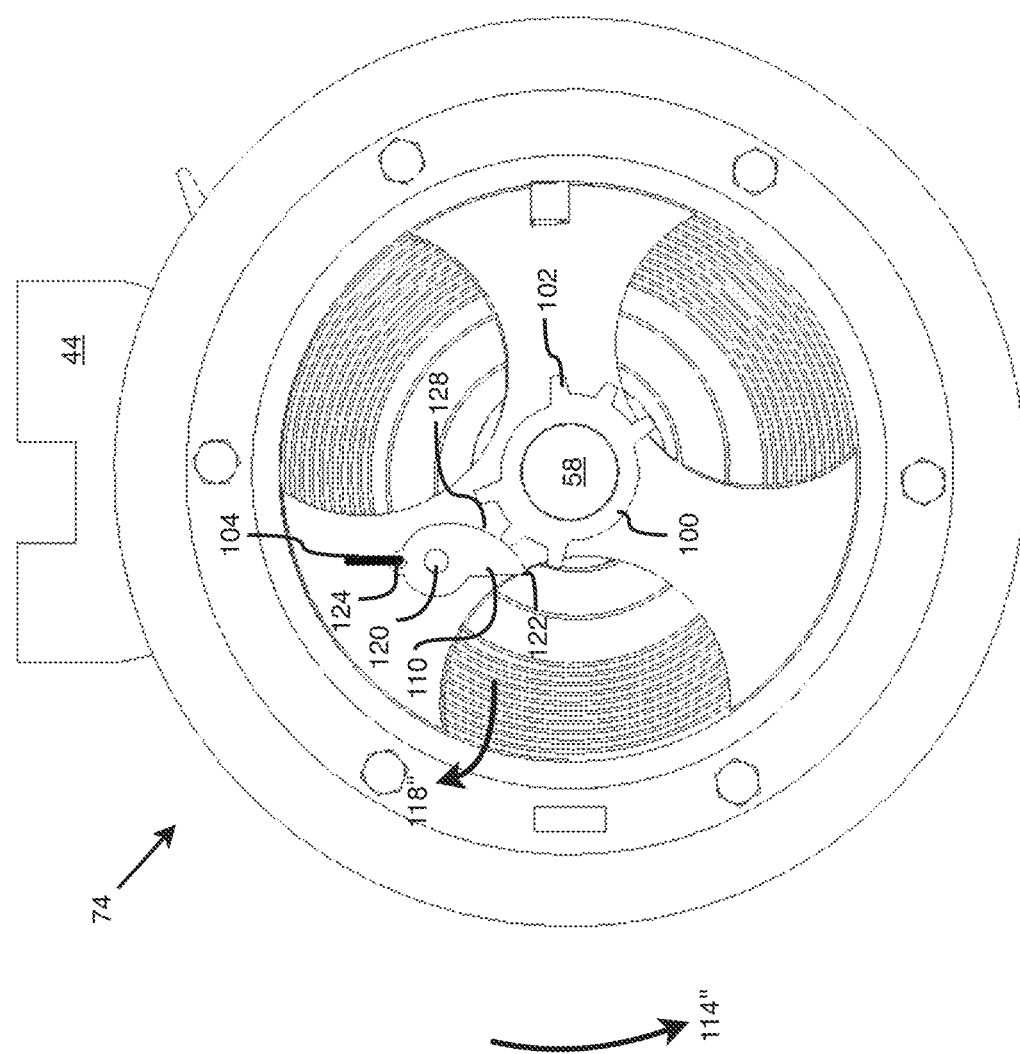
FIG. 23 is showing a right elevational view of the locking mechanism in a rewinding state of the self-retracting tie down winch of FIG. 11.

Rewinding state. If a counter-clockwise rotation 114" is induced from the free state depicted on FIG. 8, the mechanism is engaged in a rewinding state as depicted in FIG. 9.

The pawl 110 rotates in direction 118" around the pivot 120. The spring 104 biases the rounded back face 128 of the pawl 110 towards the gear 100. The round back face 128 of the pawl 110 slides over the tooth 102. This allows the tension accumulated in the recoil spring 60 to be released, spooling the tie down media 42 onto the winch shaft 58.

It should be noted that the radius of curvature of the rounded back face 128 of the pawl 110 is adapted to allow the rounded back face 128 to slide over the teeth 102 in either rotation direction 114' and 114", allowing a direction change.

The tie down media 42 comprises a mean for the tie down media 42 to remain secured to the winch in case the tie down media 42 is completely unwound from the winch shaft 58. In this embodiment a hook & loop strap also known as a Velcro™ is sewn at the end of the webbing. The hook & loop strap is inserted through a slot of the winch shaft 58, moved around the winch shaft 58 and then pressed to the corresponding portion on the webbing. The flat portion of the webbing is then sewn on itself, leaving a loop at the extremity. The webbing is inserted through the slot of the winch shaft 58. A lock pin (not shown) is inserted in the webbing loop to secure the tie down media to the winch shaft 58.

In this embodiment the tie down media 42 is fastened to the winch shaft using permanent or removable fasteners.

Referring now to FIGS. 10 to 23, another embodiment of a SRTDW 41 differ from the SRTDW 40 of FIGS. 3 to 9 in the SRTDW 41 comprising a drum 106 mounted to the winch shaft 58 to wind up the tie down media 42 around a larger cylindrical surface. The larger cylindrical surface, typically of a diameter of about 6½ inches, allows more rigid tie down media 42, e.g., steel cables, which would not wound easily around a small cylindrical surface. The larder cylindrical surface further provides a smaller ratio of number of rotations per linear unit, thus less rotations to rewind the tie down media 42 once untied from the vehicle bed. The drum 106 further provides a room therein to place the recoil spring 60 therein. Accordingly, a greater portion of the mechanism of the SRTDW 41 is located between the arms of the winch frame 44, with the winch frame 44 and the drum 106 protecting the recoil spring 60 from weather and particles.

The SRTDW 41 further features a force-multiplying mechanism 132. The force-multiplying mechanism 132 comprises a first sprocket 134 driven by the winch driver 54. The first sprocket 134 is connected to a second sprocket 136 with a chain 138. The second sprocket 136 has a greater number of teeth than the first sprocket 134, decreasing the force required to drive the winch driver 54 compared to direct driving based on the teeth ratio of the sprockets 134, 136. The second sprocket 136 is rigidly connected to the winch shaft 58, thereby transmitting power to the winch shaft 58 like if the winch driver 54 was connected to the winch shaft 58. Accordingly, the operator has less efforts to exert to both bind the tie down media 42 and to change the state of the SRTDW 41 from, e.g., the locking state to the free state.

Another feature of the SRTDW 41 is the design of the gear 100 comprising two opposed toothed parts comprising each, e.g., three (3) teeth 102, separated with two tooth-free parts, easing the task of entering the SRTDW 41 in the free state (e.g., FIG. 8) without affecting the robustness of the SRTDW 41 to stay and resist to forces induced by the tie down media 42 and the recoil spring 60 in the locking state (e.g., FIG. 7).

While preferred embodiments have been described above and illustrated in the accompanying drawings, it will be evident to those skilled in the art that modifications may be made without departing from this disclosure. Such modifications are considered as possible variants comprised in the scope of the disclosure.

What is claimed is:

1. A self-retracting tie down winch for securing a cargo on a vehicle, comprising:
   a frame for mounting to the vehicle;
   a shaft rotatably mounted to the frame adapted to receive a tie down media to be used to secure the cargo, the tie down media being adapted to be wound around the shaft, and urging rotation along with the shaft when the tie down media is wound or unwound;
   a biasing means fixedly mounted to the shaft, the biasing means being anchored to the frame; and
   a control mechanism to operate in at least two states, comprising one state preventing the tie down media to wind, and another state allowing the tie down media to rewind freely under the load accumulated in the biasing means, comprising:
   a toothed gear comprising a first tooth-free part separating two teethed parts; and
   a biased pawl cooperating with the toothed gear, wherein upon unwinding the tie down media, rotation of the shaft loads the biasing means, and wherein load accumulated in the biasing means helps rewind the tie down media around the shaft, wherein the toothed gear comprising a second first tooth-free part separating the two teethed parts.

2. The self-retracting tie down winch of claim 1, wherein the biased pawl has an abutting extremity adapted to penetrate between neighbor teeth of the toothed gear, a second extremity connected to a pawl-biasing means, and a rotation axis located between the abutting extremity and the second extremity.

3. The self-retracting tie down winch of claim 1, wherein the biased pawl comprises a rounded back face.

4. The self-retracting tie down winch of claim 3, wherein the biased pawl has an abutting extremity and wherein the rounded back face has a radius of curvature allowing the biased pawl when abutting a top of a first tooth of the toothed gear to have the abutting extremity hovering over a neighboring second tooth upon rotation of the toothed gear.

5. The self-retracting tie down winch of claim 3, wherein the biased pawl has a straight face opposed to the rounded back face.

6. The self-retracting tie down winch of claim 5, wherein the toothed gear comprises teeth having a top and a side, and wherein the control mechanism is operable according to at least three states based on if one of the rounded back face and the straight face is contacting one of the top and the side of one of the teeth.

7. The self-retracting tie down winch of claim 1, wherein the biasing means is a recoil spring.

8. The self-retracting tie down winch of claim 1, wherein the frame has a U-shaped structure having two arms with the tie down media being wound between the arms.

9. The self-retracting tie down winch of claim 1, further comprising a force-multiplying mechanism connected to the shaft.

10. The self-retracting tie down winch of claim 9, wherein the force-multiplying mechanism comprises a first dented wheel coupled to a second dented wheel.

11. The self-retracting tie down winch of claim 10, wherein the first sprocket is rotatably mounted to the frame and the second sprocket is fixedly mounted to the shaft.

12. The self-retracting tie down winch of claim 1, further comprising a drum fixedly mounted to the shaft, wherein the tie down media is wound around the drum.

13. The self-retracting tie down winch of claim 12, wherein the drum comprises a hollow cylindrical wall defining a room therein with the biasing means mounted in the room.

14. A vehicle comprising a cargo bed and a self-retracting tie down winch for securing a cargo on the cargo bed, comprising:
- a frame for mounting to the vehicle;
- a shaft rotatably mounted to the frame adapted to receive a tie down media to be used to secure the cargo, the tie down media being adapted to be wound around the shaft, and urging rotation along with the shaft when the tie down media is wound or unwound;
- a biasing means fixedly mounted to the shaft, the biasing means being anchored to the frame; and
- a control mechanism able to operate in at least two states, comprising one state preventing the tie down media to wind, and another state allowing the tie down media to rewind freely under the load accumulated in the biasing means, comprising:
  - a toothed gear comprising a first tooth-free part separating two teethed parts; and
  - a biased pawl cooperating with the first toothed gear;
- wherein upon unwinding the tie down media, rotation of the shaft loads the biasing means, and wherein load accumulated in the biasing means helps rewind the tie down media around the shaft, wherein the toothed gear comprising a second first tooth-free part separating the two teethed parts.

15. The vehicle of claim 14, wherein the biasing means is a recoil spring.

16. The vehicle of claim 14, further comprising a force-multiplying mechanism connected to the shaft.

* * * * *